United States Patent

Frommlet et al.

[11] 4,058,353
[45] Nov. 15, 1977

[54] ROLLER BEARING ASSEMBLY WITH FAILSAFE MECHANISM

[75] Inventors: Hubert Frommlet, Munich; Karl-Heinz Mautz, Ottobrunn; Klaus Brunsch, Weidach, all of Germany

[73] Assignee: Messerschmitt-Bolkow-Blohm Gesellschaft mit beschrankter Haftung, Munich, Germany

[21] Appl. No.: 671,151

[22] Filed: Mar. 29, 1976

[30] Foreign Application Priority Data

Apr. 9, 1975 Germany .............................. 2515414

[51] Int. Cl.$^2$ ............................................. F16C 44/02
[52] U.S. Cl. .................................................. 308/1 A
[58] Field of Search ........................... 308/1 A, 76, 77

[56] References Cited

U.S. PATENT DOCUMENTS

| | | |
|---|---|---|
| 2,952,238 | 9/1960 | Barber .................................. 308/1 A |
| 3,897,116 | 7/1975 | Carpenter ............................ 308/1 A |

Primary Examiner—Richard A. Bertsch
Attorney, Agent, or Firm—Toren, McGeady and Stanger

[57] ABSTRACT

One of two races of a roller bearing is equipped with a sliding ring extending thereabout, with a melting ring formed of material having a melting point higher than the normal operating temperature of the bearing being interposed between the one race and the sliding ring. Malfunction of the bearing such as might occur by seizure of the bearing rollers will cause at least partial melting of the melting ring whereupon the one race is placed in relative sliding engagement through the melting ring with the sliding ring.

12 Claims, 2 Drawing Figures

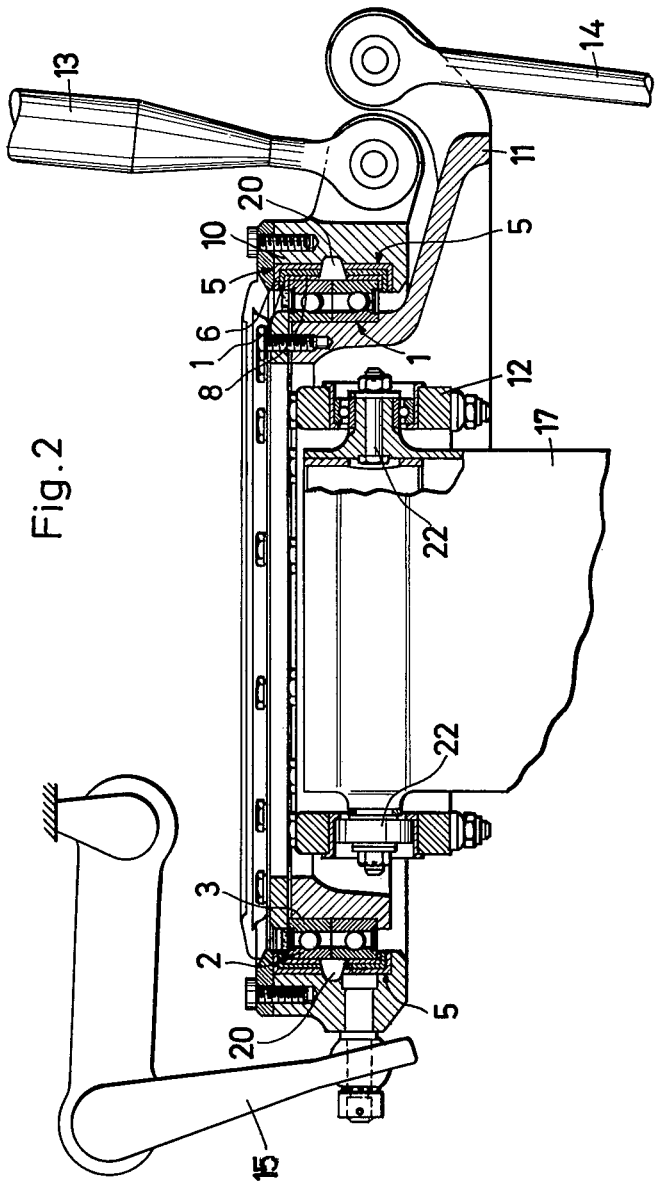
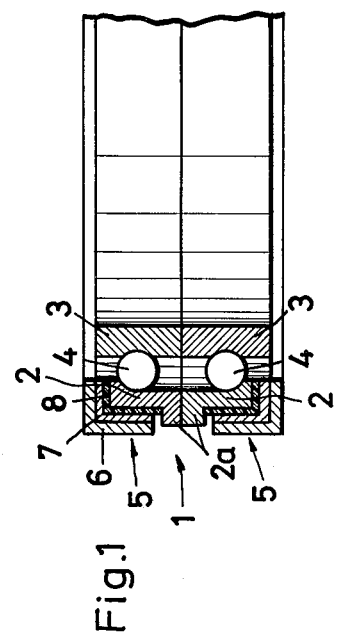

ROLLER BEARING ASSEMBLY WITH FAILSAFE MECHANISM

BACKGROUND OF THE INVENTION

The present invention is generally related to roller bearings and is more particularly concerned with a failsafe mechanism for such bearings. The invention is especially intended for use in rotor control devices for helicopters.

Roller bearings are generally rugged, reliable devices having long operating lives. Nevertheless, in many cases occurrences of bearing failure may result from any of a number of causes. Lack of proper lubrication due to maintenance errors, failure of a lubrication system, fatigue in the bearing rollers or introduction of foreign objects or materials into the path of the bearing rollers may all produce severe problems in bearing operation and may ultimately cause complete failure of the bearing. Although rare, such bearing failure can have serious consequences with regard to the operation of equipment with which the bearing is utilized. Thus, despite the fact that the risk of bearing failure is generally acceptable there nevertheless are applications where effective means for dealing with or overcoming such failures are desirable or even imperative.

An example of such an application is in control devices for helicopter rotors. Bearings are used in connection with the swash plates and sliding sleeves of helicopter rotor control devices both in the main rotor and in the tail rotor of the helicopter. It will be apparent that failure of these parts could lead to failure of the helicopter controls and could possibly cause the helicopter to crash. Accordingly, the reliability of roller bearings used in such applications is of vital importance.

In the prior art, for example German Pat. No. 1,964,217, a device is known which operates to protect axial-radial roller bearings from destruction by overheating. Such bearings are usually arranged on a shaft between an adjusting nut and a shaft collar and they are rigidly braced against each other by means of the adjusting nut. The device also includes an interposed ring disk which consists of material that will melt or evaporate when the roller bearing becomes overheated. Due to the melting or evaporation of the ring disk, tension between the roller bearings is eliminated and a reduction of the temperature of the roller bearing may be expected.

However, prior art devices of this type are generally large in size and construction and in operation there may occur an intolerable degree of clearance between the parts due to the wetting or evaporation of the ring disk. As a result, the roller bearings will be only temporarily protected against over-heating if the lubrication system fails. In the event of prolonged failure of the lubrication system, seizing and dislodgement of the bearing rollers becomes unavoidable. Such known constructions would therefore be completely unsuitable for use in situations where the bearing rollers become fatigued or where foreign objects might tend to become lodged in the path of the rollers.

The present invention is therefore directed toward providing a device which will enable a roller bearing to continue to operate satisfactorily even after the bearing rollers seize.

SUMMARY OF THE INVENTION

Briefly, the present invention may be described as a failsafe mechanism for a roller bearing assembly which includes a first race and a second race with bearing rollers operatively interposed therebetween. The particular improvement of the invention comprises a sliding ring arranged about one of the races with a melting ring being interposed between the sliding ring and said one race. The melting ring is composed of material having a melting point higher than the normal operating temperature of the bearing and if bearing failure occurs, for example by seizure of the bearing rollers, the melting ring will at least partially melt due to the resulting increase in the operating temperature of the bearing. As a result, molten parts of the melting ring material will run off externally of the bearing and a sufficiently large gap will be formed between the melting ring and the sliding ring to enable relative sliding movement therebetween. The resulting clearance which occurs can be adapted to the respective structures involved by a corresponding selection of the thickness of the melting ring. After the appropriate clearance has been developed by melting of the material of the melting ring, the bearing temperature will again drop to below the melting point of the material of the melting ring and the friction moment in the circumferential direction, which rises slightly during the rupture which occurs, subsequently drops rapidly to a low value. Without the clearance formed by the melting of the melting ring material, sliding would not be possible and the mechanical connection within which the bearing is utilized would malfunction or rupture. If such a mechanical connection involved the control element of a helicopter, failure of the control system would result.

The sliding ring is preferably formed of synthetic carbon and in accordance with the preferred embodiment of the invention, the sliding ring is enclosed by a supporting ring which is preferably made of steel.

The melting ring may be formed of plastic material, for example polyacetal.

The sliding ring, the melting ring and the supporting ring may be mounted together to form a composite ring assembly which, in one embodiment of the invention, may have a U-shaped profile or cross-section. The composite ring may, alternatively, have an angular profile. The various embodiments of the invention may be suitably utilized with single or double bearings and a gap may be provided between the composite rings which are placed from both sides upon the double bearing thereby permitting grease or other lubricant to be supplied and also permitting the proper flow of the material of the melting ring. The invention may be designed for use with conventional bearings and the composite ring, formed of the sliding ring, the supporting ring and the melting ring may be designed as a unitary structure which may be attached to the race of the bearing.

The invention is particularly intended for use in rotor control devices for helicopters.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

DESCRIPTION OF THE DRAWINGS

In the drawings:

FIG. 1 is a radial view partially in section showing a double roller bearing embodying the principles of the present invention; and FIG. 2 is a partial sectional view showing the application of the roller bearing of the present invention in the rotor control device of a helicopter.

DETAILED DESCRIPTION OF THE PREFERRED EMBODIMENTS

Referring now to the drawing wherein like reference numerals refer to similar parts throughout the figures thereof, there is shown in FIG. 1 an embodiment of the invention which is essentially a double roller bearing 1 wherein a pair of single bearings are symmetrically arranged in mirror-image relationship with each other. Each of the bearings of the double bearing 1 include an outer race 2, an inner race 3 and bearing rollers 4 operatively interposed between the races. The outer races are each formed with adjacent shoulders 2a which project radially therefrom.

The remaining outer surfaces of the outer races 2 are each enclosed by a composite ring 5 which, in the embodiment shown in FIG. 1, is formed with a generally angled profile or cross-section. Composite rings 5 each consist of a support ring 6, a sliding ring 7 and a melting ring 8 which is placed in direct contact with the outer surface of the race 2. The sliding ring 7 is preferably formed of synthetic carbon with the supporting ring 6 being preferably made of steel. The melting ring 8 is made of a material having a melting point which is higher than the normal operating temperature of the bearing but which will melt when the bearing temperature reaches a sufficient level above its normal operating temperature. The melting ring 8 may be made of plastic material, preferably polyacetal.

In the embodiment shown in FIG. 1, the melting rings 8 are preferably formed to extend in the axial direction of the double bearing 1 into abutment with the shoulders 2a of the races 2. The composite ring 5 may be designed as a separate unit and it may be press-fitted or mounted upon a conventional roller bearing with rings 6, 7 and 8 flush with each other. The rings 6 and 7 are formed to extend short of the shoulders 2a so that a gap may be formed therebetween in order to enable runoff of the molten material of the ring 8 when partial melting of the ring 8 occurs.

When the double roller bearing 1 fails to operate properly, for example by scoring, scuffing or seizure of the bearing rollers 4, heat will be generated as a result of the increased friction between the rollers 4 and the races 2 and 3. Accordingly, the operating temperature of the bearing will rise above normal levels. The heat which is thus generated will, of course, be transmitted from the races 2 to the melting rings 8. As a result of this heat transmission and the consequent heating of the melting rings 8, the melting rings will at least partially melt. Thus, at least at the side of the melting ring 8 in contact with the outer race 2, the material of the melting ring will become molten and will flow off laterally in a radially outward direction between the shoulders 2a and the rings 6 and 7. As a result of this at least partial melting of the melting rings 8 and of the flowing-off of the molten ring material, the press-fit which originally prevailed between the melting rings and the races 2 will be eliminated and there will occur between the races and the melting rings a "play" or clearance both in the axial and in the radial directions of the bearing. Accordingly, the races 2 will be sliding movable relative to the composite rings 5 as a result of the melting of the melting rings 8.

When the bearing temperature is again reduced to below the melting point of the material of the rings 8, and a clearance has been formed between the rings 8 and the races 2, lowering of the temperature will cause the remaining material of the rings 8 to again solidify. The rings 8 will then tend to operate as gliding bearing surfaces so that some relative sliding movement will occur between the inner surfaces of the rings 8 and the outer surfaces of the races 2.

In FIG. 2 there is shown a particular application of the device of the present invention with the rotor control device of a helicopter. The roller bearing assembly in accordance with the present invention may be used with particular advantage in the rotor blade control devices of helicopters both in the main rotor and in the tail rotor.

The helicopter control device depicted in FIG. 2 is of a conventional structure but is formed to incorporate therein the device of the present invention and, as indicated in FIG. 2, a composite ring 5 formed of elements similar to those shown in FIG. 1 is incorporated in the control device depicted in FIG. 2. It will be apparent that the composite ring 5 shown in FIG. 2 is formed to include the support ring 6, The sliding ring 7 and the melting ring 8 shown in FIG. 1 in a similar arrangement. However, in the embodiment of FIG. 2, the composite ring 5 is formed with a generally U-shaped profile or cross-section and a radially extending flow chamber 20 is formed in the ring 5 in order to permit lateral outward flow of the melted material of the ring 8.

The rotor control device of FIG. 2 includes a sliding sleeve 17 which is mounted upon the mast (not shown) of the rotor device and which is axially movable relative to the mast. The sleeve 17 serves the purpose of initiating collective rotor blade setting or adjustment.

The rotor control device of FIG. 2 includes a swash plate assembly consisting substantially of an outer ring 10, an intermediate ring 11 and an inner ring 12. The inner ring 12 permits the establishment of a universal type joint between the sleeve 17 and the intermediate ring 11. Thus, the ring 12 is mounted upon the sleeve 17 by pivot joints 22 which may include ball bearings and which permit relative rotation between the sleeve 17 and the ring 12 about a generally horizontal axis.

The ring 12 is mounted to the intermediate ring 11 by similar joints (not shown) each of which are spaced 90° from the joints 22 depicted in the drawing. Thus, the ring 12 is mounted upon the sleeve 17 for pivotal movement around a first horizontal axis while the intermediate ring 11 is mounted for pivotal movement relative to the ring 12 around a horizontal axis extending perpendicularly to the pivot axis of the joints 22, i.e., offset by 90° in the circumferential direction of the sleeve 17. The bearing assembly of the present invention is mounted between the intermediate ring 11 and the outer ring 10 and, as will be apparent from FIG. 2, the composite ring 5 of the assembly is placed between the outer race of the bearing assembly 1 and the inner surface of the outer ring 10.

A stationary control rod 14 of the rotor control device operates upon the intermediate ring 11 and a revolving control rod 13 is articulated upon the outer ring 10. The opposite end of the control rod 13 is connected with control levers (not shown) of the blade connections of the rotor blades of the helicopter. Furthermore, the outer ring 10 is connected through a driver 15 with the revolving rotor mast.

With the helicopter rotor rotating, the outer ring 10 is entrained thereby and the intermediate ring 11, the inner ring 12 and the sliding sleeve 17 remains stationary. If the sliding sleeve 17, and the entire swash plate assembly, are displaced in the axial direction of the rotor mast, the angles of all the blades are uniformly changed. Additionally, by means of the stationary control rod 14 the swash plate assembly may be tilted so that a periodically variable angle of incidence is imposed upon the rotor blades.

If a conventional roller bearing is used between the outer ring 10 and the intermediate ring 11, the revolving rod 13 and the driver 15 may rupture if the roller bearings seize. As a result, the helicopter could become unmaneuverable and might crash. This danger is positively avoided with the ball bearing assembly in accordance with the present invention since the bearing will continue to operate properly as a sliding bearing when the bearing rollers seize. The assembly depicted in FIG. 2 will operate essentially in the same manner as the embodiment of FIG. 1 with the melting ring 8 at least partially melting due to increases in the operating temperatures of the bearing, the melted material of the ring flowing radially outwardly through the chambers 20.

The arrangement depicted in FIG. 2 is for a main rotor but the invention may also be similarly used for the control device of the tail rotor of the helicopter. The tail rotor control device is similar but somewhat simpler inasmuch as a stationary control rod is not utilized, and only a uniform variation of the angle of the rotor blades is necessary in operation of the tail rotor. Here again, the helicopter would become unmaneuverable if the rollers between the outer and intermediate ring of the tail rotor control device failed and as a result the helicopter could be in immediate danger of crashing.

While specific embodiments of the invention have been shown and described in detail to illustrate the application of the inventive principles, it will be understood that the invention may be embodied otherwise without departing from such principles.

What is claimed is:

1. In a roller bearing assembly including a first race, a second race and bearing rollers operatively interposed therebetween, the improvement comprising a sliding ring arranged about one of said races and a melting ring interposed between said sliding ring and said one race, said melting ring being composed of material having a melting point higher than the normal operating temperature of said bearing, the material of said melting ring being such that it will melt when the operating temperature of the bearing rises above a normal operating temperature, with at least partial melting of said melting ring operating to enable relative sliding motion between said one race and said sliding ring.

2. An assembly according to claim 1 wherein said melting ring consists of plastic material.

3. An assembly according to claim 2 wherein said plastic material is polyacetal.

4. An assembly according to claim 1 wherein said sliding ring consists of synthetic carbon.

5. An assembly according to claim 1 further including a supporting ring mounted about said sliding ring.

6. An assembly according to claim 5 wherein said melting ring, said sliding ring and said supporting ring are joined together to form a ring assembly having an angled profile.

7. An assembly according to claim 5 wherein said melting ring, said sliding ring and said supporting ring are joined together to form a ring assembly having a U-shaped profile.

8. An assembly according to claim 7 wherein said ring assembly is divided in the radial direction.

9. An assembly according to claim 5 wherein said melting ring, said sliding ring and said supporting ring are joined together in a unitary composite ring assembly adapted to be attached to said one race.

10. An assembly according to claim 9 wherein said ring assembly is divided in the radial direction.

11. An assembly according to claim 1 wherein said melting ring is open on a side thereof.

12. An assembly according to claim 1 wherein said bearing assembly is mounted as a bearing of a revolving ring of the swash plate of a rotor blade control device for helicopters.

* * * * *